Patented Sept. 6, 1938

2,129,126

UNITED STATES PATENT OFFICE 2,129,126

ADHESIVE COMPOSITION

Warren E. Glancy, Waltham, Mass., assignor to Hood Rubber Company, Inc., Watertown, Mass., a corporation of Delaware No Drawing. Application June 15, 1937,
Serial No. 148,302

11 Claims. (Cl. 134—23.6)

This invention relates to adhesive compositions embodying rubber in aqueous suspension as the principal ingredient, and has for its chief objects the provision of a stable adhesive composition of general utility possessing superior adhesive qualities and, in particular, requiring a minimum time for setting even under adverse conditions, and generally to provide economy and satisfaction in adhesives and adhesive methods.

It has heretofore been proposed to use rubber latex and analogous aqueous dispersions of rubber as adhesives for various materials, both for miscellaneous or casual adhesive jobs around the home and office and for production operations involving the adhesion of constituent parts of a manufactured article. Whereas the casual use of latex adhesives has increased rapidly, time being of little importance in such applications, the use of latex adhesives in commercial manufacturing operations has been seriously retarded by the relatively long drying period required to set a film of the ordinary rubber latex adhesive to the degree necessary for securing maximum adhesive efficiency.

For example, one of the most extensive potential fields for use of latex adhesives is the footwear industry, particularly the rubber and canvas footwear industry, but when a shoe sole and the bottom of a lasted upper and innersole are coated by brushing with a common latex adhesive, as in a typical manufacturing operation, a drying period as long as forty-five minutes may be required to set the latex film sufficiently to permit bringing the parts together in adhesive union if most satisfactory results are to be achieved. Even longer periods may be required under adverse conditions of high humidity. Such long drying periods obviously are impractical in present day manufacturing operations.

I have discovered a fast-setting rubber latex adhesive composition which, although quite stable and capable of long storage without deterioration or coagulation, will, upon being spread in a film, nevertheless set quickly in a fraction of the time required for setting ordinary latex adhesives and will provide a superior and lasting adhesive bond under the most adverse conditions. A preferred adhesive composition consists essentially of rubber latex, preferably ammonia-preserved concentrated latex, and a minor proportion of succinimide. The succinimide may be added to the latex in quantities up to ten or fifteen percent. but such large quantities are not required and I preferably use only from one to five percent. of succinimide. The latex preferably should contain about 0.5% of ammonia. The invention, however, is not limited to any particular proportion of materials but is capable of wide variations in this respect. Similarly, other volatile preservatives may be substituted for the ammonia and used in varying proportions. The latex may be either a natural rubber latex or an artificially prepared aqueous dispersion of rubber or analogous natural or synthetic material, but desirably should be concentrated until it contains not less than 45% total solids so that a minimum setting time may be achieved. Other materials may be added, including vulcanizing agents, age-resisters, pigments, fillers, colloids, preservatives or other conditioning agents, according to well known practice.

An adhesive composition which has been used in the commercial production of footwear was prepared by adding two parts by weight of succinimide to 100 parts of the centrifugally concentrated rubber latex of commerce containing approximately 60% total solids and about 0.5% of ammonia. When, for example, the rubber sole and bottom of a lasted fabric upper and insole of a shoe are separately coated, as by brushing, spraying, or dipping, with a thin film of such a composition, a drying time as short as six minutes at room temperature, when the major part of the volatile ammonia but little of the water will have been evaporated, has been found to be adequate for setting the adhesive films to the degree necessary for bringing the coated parts together in adhesive union to provide a bond of superior and lasting quality. Such a composition retains its superiority in time of setting even under conditions of high humidity.

The present invention accordingly effects substantial savings in time and generally speeds up production operations and at the same time provides a thoroughly satisfactory adhesive bond, and therefore attains to a high degree the objects set forth.

Other imides such as phthalimide, potassium phthalimide, sodium ortho benzoic sulfimide and the like have been substituted for the preferred succinimide but are less effective than the preferred material, either because of their lower solubility in water, or as in the case of potassium phthalimide, because of its excessive alkalinity.

Numerous other modifications and variations in details of the invention as herein described may be made without departing from the spirit and scope of the invention as defined by the appended claims.

I claim:

1. An aqueous dispersion of rubber containing a water-soluble imide of an acid selected from the class consisting of succinic acid, phthalic acid and sulfo-benzoic acid.

2. An aqueous dispersion of rubber containing succinimide.

3. A composition of matter comprising rubber latex and succinimide.

4. A composition of matter comprising rubber latex, a volatile alkali, and succinimide.

5. A composition of matter comprising concentrated rubber latex and a minor proportion of succinimide.

6. A composition of matter comprising concentrated rubber latex, a small proportion of ammonia, and a minor proportion of succinimide.

7. A composition of matter comprising concentrated rubber latex, a small proportion of ammonia, and not more than five percent. of succinimide.

8. A composition of matter comprising rubber latex of not less than forty-five percent. total solids content, a small proportion of a volatile alkali, and a minor proportion of succinimide.

9. A quick-setting adhesive composition comprising centrifugally concentrated rubber latex containing approximately sixty percent. total solids and approximately one-half percent. of ammonia to which has been added not more than five percent. of succinimide.

10. An aqueous dispersion of rubber containing an imide of phthalic acid.

11. An aqueous dispersion of rubber containing an imide of sulfo-benzoic acid.

WARREN E. GLANCY.